US005183990A

United States Patent [19]
Enyedy

[11] Patent Number: 5,183,990
[45] Date of Patent: Feb. 2, 1993

[54] METHOD AND CIRCUIT FOR PROTECTING PLASMA NOZZLE

[75] Inventor: Edward A. Enyedy, Eastlake, Ohio

[73] Assignee: The Lincoln Electric Company, Cleveland, Ohio

[21] Appl. No.: 684,331

[22] Filed: Apr. 12, 1991

[51] Int. Cl.⁵ .................................... B23K 10/00
[52] U.S. Cl. ...................................... 219/121.54
[58] Field of Search .............. 219/121.54, 121.56, 219/121.57

[56] References Cited

U.S. PATENT DOCUMENTS

| | | | |
|---|---|---|---|
| 3,558,973 | 1/1971 | Pochert et al. | 315/111.21 |
| 3,809,850 | 5/1974 | Saenger, Jr. | 219/121.54 |
| 4,330,700 | 5/1982 | Jagieniak et al. | 219/121.54 |
| 4,585,921 | 4/1986 | Wilkins et al. | 219/121.54 |
| 4,814,577 | 3/1989 | Dallavalle et al. | 219/121.57 |
| 4,839,499 | 6/1989 | Kotecki et al. | 219/121.54 |
| 4,929,811 | 5/1990 | Blankenship | 219/121.54 |
| 4,975,557 | 12/1990 | Yamada et al. | 219/69.12 |
| 4,987,285 | 1/1991 | Dallavalle et al. | 219/121.54 |
| 5,036,176 | 7/1991 | Yamaguchi et al. | 219/121.54 |

FOREIGN PATENT DOCUMENTS 61-63366 4/1986 Japan ................. 219/121.57
3-479 1/1991 Japan .

Primary Examiner—Bruce A. Reynolds
Assistant Examiner—John A. Jeffery
Attorney, Agent, or Firm—Body, Vickers & Daniels

[57] ABSTRACT

A system, method and circuit for protecting a plasma nozzle of the type including an electrode within the nozzle and a paper supply for creating an arc between the electrode and nozzle for establishing a plasma issuing from the nozzle toward a workpiece, which system, method and circuit detects when the nozzle contacts or drags along the workpiece and shifts the power supply to a low current operating mode if the power supply is in a high current operating mode.

37 Claims, 6 Drawing Sheets

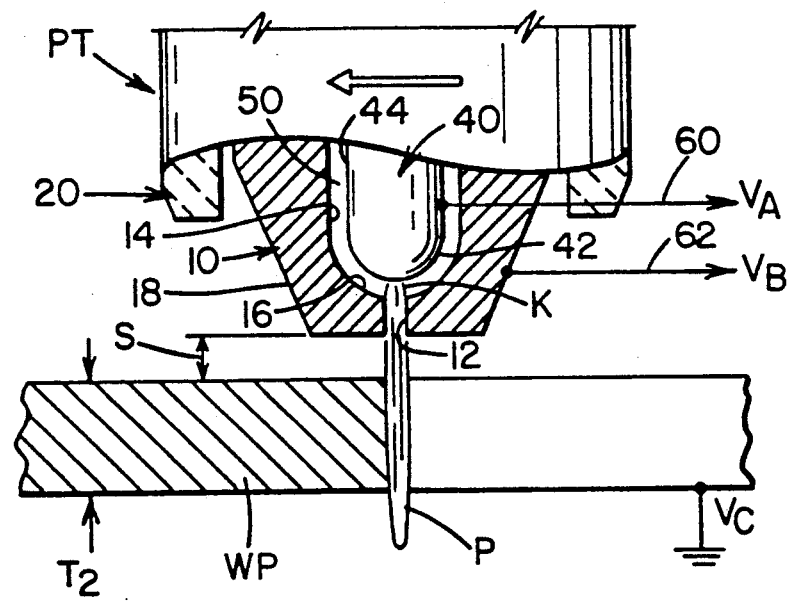
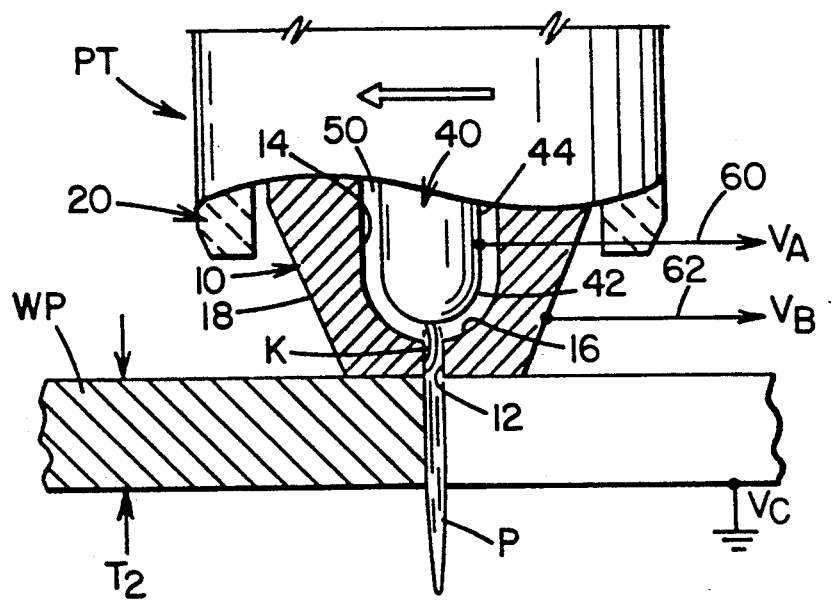

METHOD AND CIRCUIT FOR PROTECTING PLASMA NOZZLE

The present invention relates to the art of plasma torches of the type including an electrode within a cavity of a nozzle and employing electric energy for establishing an arc between the electrode and nozzle to maintain a plasma issuing from the nozzle, and more particularly, to a system, method and circuit for protecting the nozzle of the plasma torch.

INCORPORATION BY REFERENCE

A large variety of plasma torch designs has been used in the past. These designs employ a nozzle with a generally cylindrical cavity receiving a generally cylindrical electrode with a power supply providing current for establishing an arc between the electrode and nozzle. This type of nozzle is shown in Blankenship U.S. Pat. No. 4,929,811. Since plasma arc torches involve electrical current, a variety of protection circuits are employed. One of these circuits is illustrated in Blankenship U.S. Pat. No. 4,929,811. Another electrical protection circuit is illustrated in Dallavale U.S. Pat. No. 4,987,285. Both of these prior patents are incorporated by reference herein for background information applicable to the present invention and so that details of the plasma torch technology need not be repeated.

BACKGROUND OF INVENTION

Plasma arc torches are employed for cutting metal of various thicknesses. These plasma cutting torches involve an electrode within a cylindrical cavity of a nozzle having an outlet through which the plasma column issues after being established in the annular passageway between the electrode and nozzle. Electrical energy established by a voltage differential between the electrode and nozzle creates an arc in the nozzle for ionizing the gas before it passes from the outlet of the nozzle toward the workpiece, normally metal. The material being cut is conductive and has a variety of thicknesses. The plasma cutting process creates ionized gases within the annular chamber between the nozzle and electrode which establishes and maintains the plasma arc column due to the energy provided by the power supply connected between the nozzle and electrode and between the nozzle and the workpiece. A vortex action of the plasma gas passing through the annular chamber in the nozzle is caused by forcing the gas through a plurality of holes leading to the gas passageway. The swirling gas is focused in the nozzle chamber where it can be ionized and discharged through the small orifice or outlet of the nozzle. During cutting of relatively thin metal workpieces, the nozzle of the plasma torch is often dragged directly over and in contact with the metal. The torch is operated in a low current mode which maintains a current in the range of about 35-50 amperes, which is at a set point sufficient to sustain a stable arc and to obtain realistic traveling speeds and cutting quality. The low current mode of operation, with a current in the general neighborhood of 40 amperes, does not cause substantial nozzle damage even when the conductive nozzle is dragged along the conductive metal workpiece with the arc extending through the nozzle opening. The low current causes a lower energy and, thus, does not substantially overheat the nozzle. However, when cutting thick metal, the plasma torch is operated in a high current mode wherein the power supply is set at a current level over 75 amperes. With this high current flow necessary to sustain a focused arc plasma sufficiently powerful to cut a relatively thick workpiece, the nozzle itself must be maintained above the conductive workpiece so that the nozzle does not contact the workpiece and allow the arc to attach to the nozzle. In practice, an maintains the nozzle at least about 0.100-0.125 inches from the metal workpiece being cut by the moving plasma torch as the torch is operated in a high current mode. The relationship between the arc current supplied to the torch and the thickness of the metal being cut is generally set so that the ratio of the arc current amperes divided by 100 equals the thickness of the plate which can be cut. Thus, with approximately 40 amperes of arc current, which is considered the low current mode of operation, a metal plate of 0.40 can be cut efficiently by the moving plasma torch. The torch can be operated with the nozzle in contact with and being dragged along the workpiece. As the thickness of the workpiece increases to 0.750 inches, the arc current is set at the power supply to be in the high current mode, which mode exceeds about 75 amperes. The high current mode is generally above 40-50 amperes and preferably above about 25 amperes. In this high current mode of operation, it is essential that the nozzle not drag along or contact the workpiece. If the nozzle contacts the workpiece in the high current mode of operation, the life of the nozzle, and thus, the torch is drastically reduced. Thus, during the high current mode of operation, it is considered somewhat mandatory to maintain a certain spacing between the nozzle and the workpiece being cut. This requires manual dexterity skills, especially when the cut is to produce a bevel edge. In this instance, gaging the spacing of the torch from the workpiece becomes somewhat difficult.

When a plasma system is operated by an unskilled operator, it is not uncommon for the torch to be operated with the nozzle in contact with the workpiece. This does not present a problem if the thickness of the workpiece is relatively thin and the current is adjusted to the low current mode in the general range of 35-50 amperes. The arc extending through the nozzle has a low power density and does not cause high temperature and rapid heating of the nozzle. However, if the inexperienced operator performs the plasma cutting process in the high current mode with current greater than about 50 amperes, the nozzle is grounded by the workpiece. This places the nozzle at the same voltage as the grounded workpiece. When this occurs, it is highly probable that the arc establishing the plasma will actually attach to the nozzle at the outlet walls. This causes an erosion of the nozzle at the outlet. Indeed, since the intent of the plasma is to cut metal, the arc extending through the outlet of the nozzle and attached to the nozzle quickly cuts through the nozzle and destroys the nozzle portion of the torch. In many instances, the operator has absolutely no indication of the reason for the short life of the torch. He replaces the nozzle or the total torch and proceeds in the normal operation. The electrode and nozzle wear with time, since these components are considered to be consumables; however, the use of a plasma cutting torch in a high current mode of operation with the nozzle in contact with the workpiece being cut erodes the nozzle in substantially less time than when the torch is operated properly. This damage to the nozzle is in a substantial order of magnitude faster than should be experienced. Rapid damage to the nozzle causes persons to feel that plasma cutting of metal is not economical. Consequently, in many instances the plasma cutting torch is believed to be too fragile for cutting thick plate, when the problem is not the normal wear of the torch itself, but improper operation of the plasma cutting torch by contacting or dragging the nozzle along the workpiece. The same problem is created in bevel cutting of metal with a plasma torch operated in the high current mode. High arc current is normally required in bevel cutting because of the substantial distance between the workpiece and the outlet of the nozzle. With the torch held at an angle there is a higher probability that the corner of the nozzle will contact the workpiece during bevel cutting. This propensity to contact the workpiece increases the probability of causing the arc to attach to the nozzle. This will destroy the nozzle quite rapidly. Such rapid destruction of the nozzle is more severe in the higher current mode of operation. Also, continuous dragging of the nozzle along the workpiece while operating at high power will damage the torch itself. However, this torch damage occurs slower than nozzle failure.

Consequently, there is substantial adverse market resistance to plasma cutting of metal plates due to the shortness of nozzle life, which is often caused by improper operation of the plasma cutting torch. In the low current mode of operation, i.e. in the neighborhood of about 40 amperes of arc current, the arc does not have sufficient energy to erode the nozzle even if the arc attaches to the nozzle and not the workpiece. The heat is dissipated to keep the nozzle cool. If the arc attaches to the nozzle, which will occur even at an operating current of 40 amperes, the energy density (power) is not nearly as high as in high current operation; consequently, the nozzle life is not substantially shortened.

An operator should know that in the higher current mode of operation a spacing must be maintained between the torch and the workpiece. In addition, the operator should know that if the nozzle is being powered in the high arc current mode when the torch is laid on a grounded plate damage to the nozzle will be caused immediately. Indeed, the nozzle can be melted in this situation. At the lower current operating modes, the arc current is not sufficient to increase the temperature of the nozzle to a melting point temperature. The workpiece or plate will produce a sufficient heat sink to prevent damage to the torch when it is placed on a grounded plate while being operated or driven by power supply in the low arc current mode of operation.

THE INVENTION

The disadvantages experienced in destroying or damaging the nozzle of a plasma torch quite rapidly when operated in a high current mode of operation is overcome by the present invention. In accordance with the invention, the nozzle voltage is monitored to detect when the nozzle is being dragged along, or in contact with, the workpiece or metal plate being cut. If the nozzle is being dragged along the plate while being operated in the high current mode of operation, the power supply is shifted to a low current mode of operation with the arc current being held at a lower level, such as about 40 amperes. In the alternative, the power supply is prevented from increasing the current above a lower level, such as 40 amperes. When the nozzle is lifted from the workpiece the monitored voltage senses this condition and allows the power supply to be shifted to the high current mode of operation. Thus, after a contact has been sensed by the monitoring circuit of the present invention, the plasma power supply is shifted back to the set value for high current operation. In this manner, damage to the nozzle of the plasma torch is prevented or reduced when the nozzle contacts the workpiece during high current operating conditions.

This invention has been used successful with a 125 ampere Lincoln Magnum PCT 125 torch powered by a Pro-Cut 125 power supply with a normal phase back input control. When the monitoring circuit detected contact of the plasma torch nozzle with the workpiece, the power supply current was reduced from a set point of 125 amperes down to a low current mode of operation at a current level of 40 amperes. This reduced current maintained the arc but substantially reduced the damage to the nozzle due to contact with the workpiece. Reduction of the nozzle voltage to the grounded voltage of the workpiece indicates that the nozzle is touching the workpiece. Thus, the present invention monitors the voltage of the nozzle. As the nozzle voltage approaches the workpiece voltage, i.e. ground, the power supply is phased back to shift the arc current from 125 amperes to 40 amperes.

By employing the present invention, the operation of the plasma torch is not interrupted upon detection of contact between the nozzle and workpiece. Th input rectifier of the power supply is merely phased back to the lower arc current mode, which is approximately 40 amperes in the preferred embodiment. Otherwise, the torch is operated in the high current mode which is at any set point substantially above the 40 ampere lower current level. When the nozzle contacts the workpiece, the torch is not turned off, which action would extinguish the plasma creating arc. Such an action would adversely affect the metal cutting operation. In some instances an abrupt shut down of the torch would surprise the operator and would require that the operator restart the torch by actuating the torch trigger. By using the present invention, the operator will know when the power supply is a shift from the high current mode of operation to the low current mode upon contact between the nozzle and workpiece; therefore, the operator merely withdraws the torch slightly from the workpiece. This minor action establishes a space between the nozzle and workpiece, which immediately shifts the operation of the power supply back to the set point of the high current mode of operation. This high current operation is controlled by the current set point of the power supply. This power supply set point can be adjusted for different thicknesses of metal being cut. The arc current supplied to the torch is the current which passes between the electrode and the nozzle or workpiece for sustaining the plasma as the swirling gas moves through the nozzle toward the outlet of the nozzle. This current controls the energy available for the arc plasma cutting.

In accordance with the present invention, there is provided a circuit for protecting the nozzle of a plasma arc torch as it is operated at a high set point current, which circuit comprises means for sensing the voltage at the nozzle, means for comparing the nozzle voltage with a reference voltage and means for limiting or reducing the arc current to the torch when the nozzle voltage is within a selected range of the reference voltage. In accordance with a more limited aspect of the invention, the reference voltage is the voltage of the workpiece, which is normally grounded. In accordance with still another aspect of the invention, the range or threshold is less than 5.0 volts. In normal practice, the nozzle voltage is in the general range of −60/−120 volts D.C. This provides approximately 60 volts between the reference voltage and the nozzle voltage. When this voltage difference between the nozzle and the workpiece is less than 5.0 volts, there is a detection causing a contact signal which phases back the power supply to a low current level of approximately 40 amperes. The power supply could also be adjusted to merely limit the operation current to a low value such as 40 amperes. This second mode of operation can be defined as a low, non-destructive current in the range of 3514 50 amperes.

In accordance with another aspect of the invention there is provided a system and method of using the protective circuit as defined above. This system includes means for detecting contact of the nozzle with the workpiece and means responsive to such detection for holding the current control means in the second mode at a low current level. The term "holding" means selectively shifting the power supply into the second arc current mode of operation. The first mode of operation can be defined as a set current in the general range of 75-100 amperes; however, broadly speaking the power supply in the first mode of operation, which is considered the high current mode of operation, is at a current set point substantially above the low or second current mode of operation. This high set point current can be substantially above 50 amperes.

In accordance with another aspect of the invention, the protective circuit as defined above is used as a method of protecting the nozzle of a plasma torch of the type comprising a nozzle with a plasma outlet opening and an internal chamber and an elongated electrode in the chamber and spaced from the nozzle a distance defining an annular gas passage means for allowing flow of a plasma gas through the passage means and through the outlet for the impingement against a spaced workpiece to be cut. This method involves the steps of detecting contact of the workpiece and nozzle to thus identify a serious wear condition and holding, i.e. shifting the current control means in the second mode in response to the contact detection. The detection employs a voltage divider to indicate when the voltage between the nozzle and workpiece is less than 5.0 volts. This low voltage indicates contact of the nozzle and the workpiece. Contact is also signaled when the torch is laid against a grounded metal plate which simulates workpiece contact. In accordance with the invention, the power supply is phased back to a low current mode of operation or low current level. The power supply is not turned off which would cause the arc to be extinguished and require restriking of the arc and restarting procedures for the plasma cutting operation.

The primary object of the present invention is the provision of a circuit, system and method for protecting a plasma arc torch from damage when the nozzle of the torch engages the workpiece or another grounded plate.

Another object of the present invention is the provision of a circuit, system and method, as defined above, which circuit, system and method senses contact between the nozzle and workpiece and immediately shifts the plasma arc torch from a high current operation at a high set point current to a low current operation at a lower set point current or to a maximum current level. If the torch is operating at the low current level when contact is made, no action is required by the circuit, system or method.

Still a further object of the present invention is the provision of a circuit, system and method, as defined above, which circuit, system and method is somewhat easy to implement and does not add substantially to the cost of the plasma arc torch, while substantially enhancing operation of the torch and causing plasma cutting to be accepted as an economical industrial cutting procedure.

These and other objects and advantages will become apparent from the following description taken together with the accompanying drawings.

BRIEF DESCRIPTION OF DRAWINGS

FIG. 2B is a partial schematic view showing a plasma arc torch operated properly in the high current mode for cutting a thicker metal workpiece;

FIG. 2C is a partial schematic view showing a plasma arc torch operated improperly in the high current mode of operation and with the nozzle contacting and dragging along the workpiece;

PREFERRED EMBODIMENT

Figure 1:
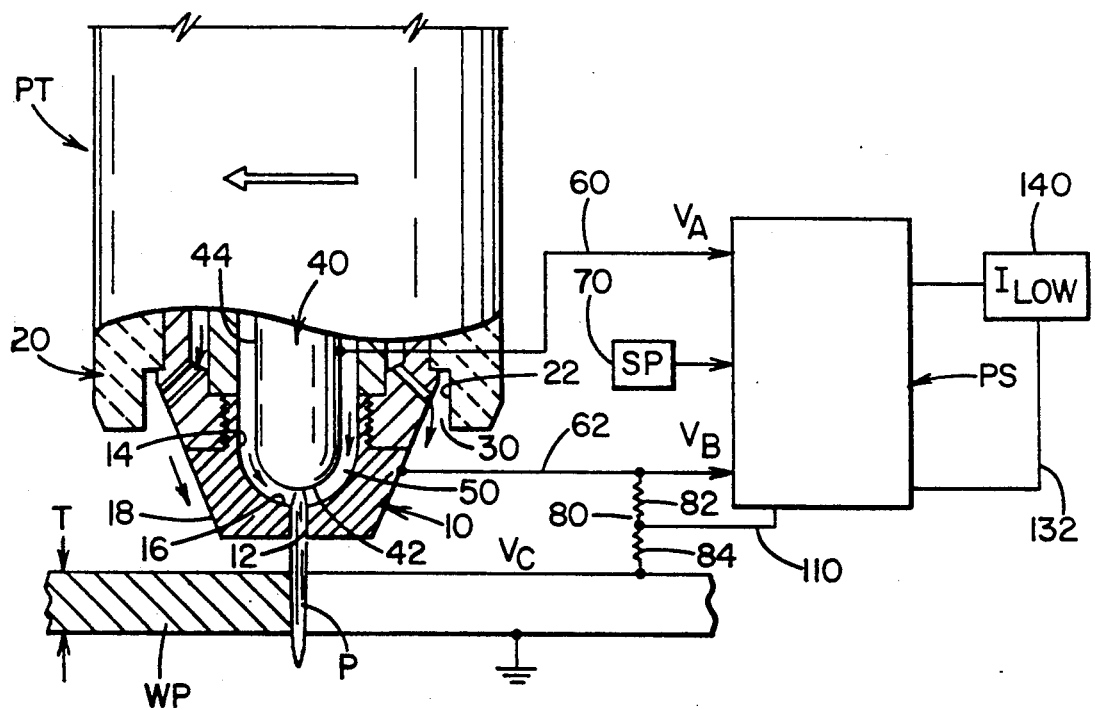
FIG. 1 is a schematic view of the preferred embodiment of the present invention showing a plasma arc nozzle cutting a plate and schematically illustrating a power supply and current phase back control.

Referring now to the drawings wherein the showings are for the purpose of schematically illustrating the preferred embodiment of the present invention, and alternatives thereof, and not for the purpose of limiting same, FIG. 1 shows a plasma arc cutting torch PT for cutting a workpiece WP as the torch moves in the direction indicated by the arrow. The workpiece is conductive and has a thickness T. The plasma P issuing from the torch is used for the cutting process. In practice, the current applied to the torch by power supply PS is adjusted to a set point current which is roughly determined by the mathematical relationship that the arc current in amperes divided by 100 is the thickness T for optimum cutting. This relationship is illustrative and is not intended to be a limitation to the invention. If the workpiece is less than about 0.400 inches, the set point is generally at 40 amperes. This low current operation is referred to as the low current mode for the torch. This low current mode may be in the general range of 35–50 amperes, but in practice it is 40 amperes. A high current mode of torch PT indicates that the torch has a current set point at an adjustable high Current level, such as greater than 75 amperes. The high current setting can be at any high current level above the low current mode which in the preferred embodiment is 40 amperes. In accordance with standard practice, torch PT includes an electrically conductive nozzle 10 having a lower outlet 12 through which plasma arc P issues for cutting workpiece WP. The nozzle is formed from a metal, such as copper, and includes a generally cylindrical inner chamber 14 terminating in a lower generally semi-spherical end 16 at outlet 12. As an optional feature the outer surface 18 of the nozzle coacts with surface 22 of an insulated housing 20 to define a torch coolant gas passage 30. Showing of this feature is for illustrative purposes only and does not form a part of the present invention. Within cylindrical chamber 14 there is located an elongated electrode 40, which is often water cooled, terminating in a lower spherical end 42 generally matching the semi-spherical end 16 of chamber 14. Although not illustrated, the spherical end 42 of electrode 40 is provided with an appropriate high melting point insert. In accordance with standard plasma torch practice, the outer surface 44 of electrode 40 coacts with the inner surface of chamber 14 to define a plasma gas passage 50 through which a gas flows, normally in a vortex. This gas is ionized into a plasma that passes through outlet 12. When power supply PS applies a voltage across electrode 40 and nozzle 10, both of which are conductive metal, an arc is created in gas passage 50 to ionize the gas which arc is plasma P that cuts workpiece WP.

Power supply PS, in accordance with the preferred embodiment, is a solid state inverter with a standard phase controlled input rectifier for directing rectified three phase line current to the input of the inverter. The phase controlled rectifier can be adjusted to set the current available from power supply PS. The output current of the inverter is used to sustain an arc plasma between electrode 40 and workpiece WP during normal operation of torch PT. The voltage across lines 60, 62 is voltage between the electrode and nozzle. In practice, the voltage $V_A$ at line 60 is in the range of $-80$ to $-150$ volts D.C. Voltage $V_B$ at line 62 is applied to nozzle 10 and is in the general range of $-60$ to $-120$ volts D.C. A manually adjustable set point control 70 adjusts the input stage of power supply PS to set the desired arc current allowed to flow from the electrode to the workpiece during the cutting operation of torch PT. When a relatively thin workpiece WP is being cut, set point control 70 phases back the input rectifier to approximately 40 amperes of arc current flow between the electrode and workpiece or nozzle. As thicker metal is being cut, or when the cut is being done more rapidly, set point control 70 is adjusted to a high current mode of operation, such as setting of the arc current to a value above about 50 amperes and preferably above 75–100 amperes. Thus, set point adjustment for the power supply has a lower mode with current of approximately 40 amperes and an upper adjustable set point level with a higher current determined by manual control 70. A resistor, or resistor network 80, connects line 62 to workpiece WP, which is normally grounded. The resistor or resistor network is shown in more detail in FIGS. 4 and 5. By using a resistor network, voltage $V_A$ is the potential at electrode 40, voltage VB is the potential of nozzle 10 and voltage $V_C$ is the potential of workpiece WP. Under normal operation, the thickness of the workpiece is known and set point device or control 70 selects the set point. This set point can be at a low minimum current of 40 amperes or at a higher current mode, such as an arc current at above 75–100 amperes. As so far described, plasma torch PT is operated in accordance with standard cutting practice.

Figure 2A:
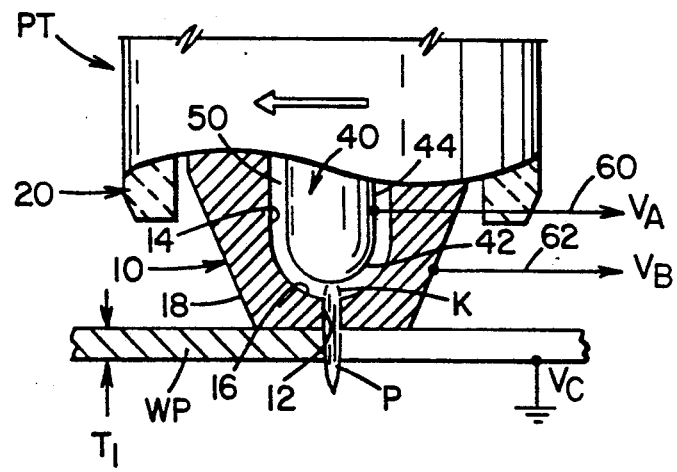
FIG. 2A is a partial schematic view illustrating normal operation of the plasma arc torch in a low current mode of operation to cut a thin metal plate.
Figure 2D:
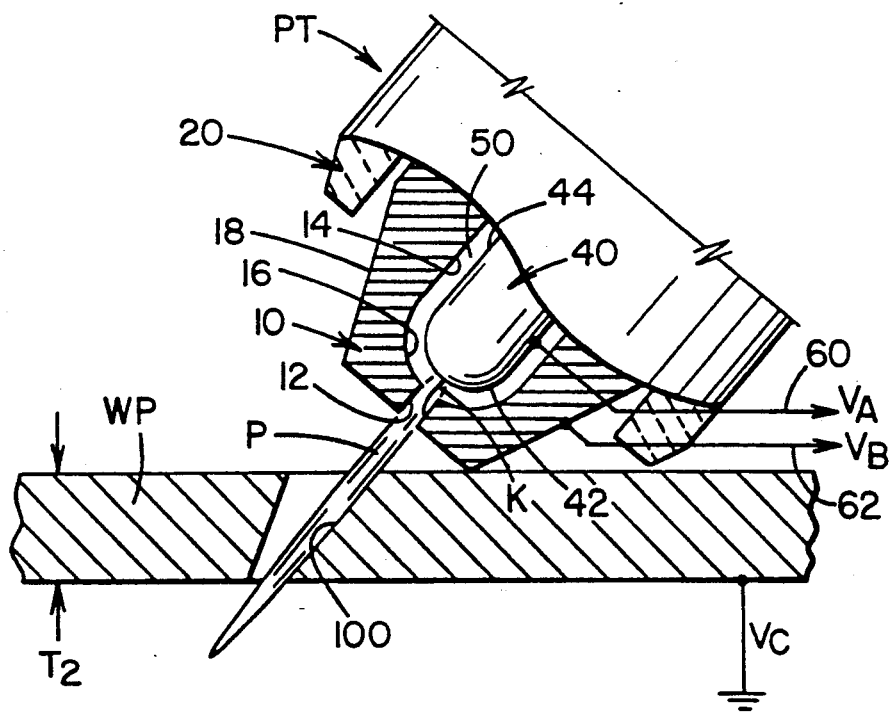
FIG. 2D is a partial schematic view showing a plasma arc torch operating in the high current mode for bevel cutting a metal plate, with the nozzle improperly contacting the workpiece.

Referring now to FIGS. 2A–2D, operating procedures for plasma torch PT are schematically illustrated. In FIG. 2A, torch PT is operated at the lower minimum current level of 40 amperes to cut workpiece WP having a relatively small thickness $T_1$. Since the current is relatively low the arc energy is low and the arc K bridges the gap through outlet 12 and between the electrode and the workpiece with plasma P. Consequently, the arc K remains in the plasma and heats the workpiece. The nozzle can be in contact with workpiece WP and can be dragged along the workpiece without substantial harm to the electrode. If arc K attaches to the nozzle, it does not have sufficient energy to damage or cut the metal of the nozzle. When the thickness of the workpiece WP is increased to a substantial value $T_2$, as shown in FIG. 2B, nozzle 10 must be held at a spacing from workpiece WP during the cutting operation. Since spacing S, which is normally in the general range of 0.100–0.125 inches, arc K passes through outlet 12 in the plasma. When high current of a high operating mode is provided by power supply PS the spacing prevents the arc from attaching to the nozzle. This higher arc current is required to provide more energy to create a sufficient energy in plasma P for cutting the thicker workpiece. Spacing S and the thickness of the workpiece demands that the plasma column P extends at a sustained energy level for a substantial distance from outlet 12. The cutting operation for the thicker plate is optimized and the high current value is set above the minimum or low mode. So long as the nozzle does not contact the workpiece while the high current mode is used, the nozzle has substantial life. This life is drastically reduced if torch PT engages workpiece WP as is shown schematically in FIG. 2C. Spacing S is zero. When this occurs, arc K tends to attach to the nozzle at the walls of outlet 12. This arcing condition causes substantial damage to the nozzle. Thus, high current operation for cutting, as illustrated in FIG. 2C, will cause drastic and rapid deterioration of the torch by destroying the end of nozzle 10 if the operator allows the nozzle to contact the workpiece being cut. The same detrimental effect can occur when cutting a bevel edge 100, as shown in FIG. 2D. If nozzle 10 is held at an angle it can be more easily moved into contact with workpiece WP, as shown in FIG. 2D. Arc K tends to attach to the nozzle. Such arc displacement also causes rapid deterioration of the nozzle and, thus, torch life.

Figure 3A:
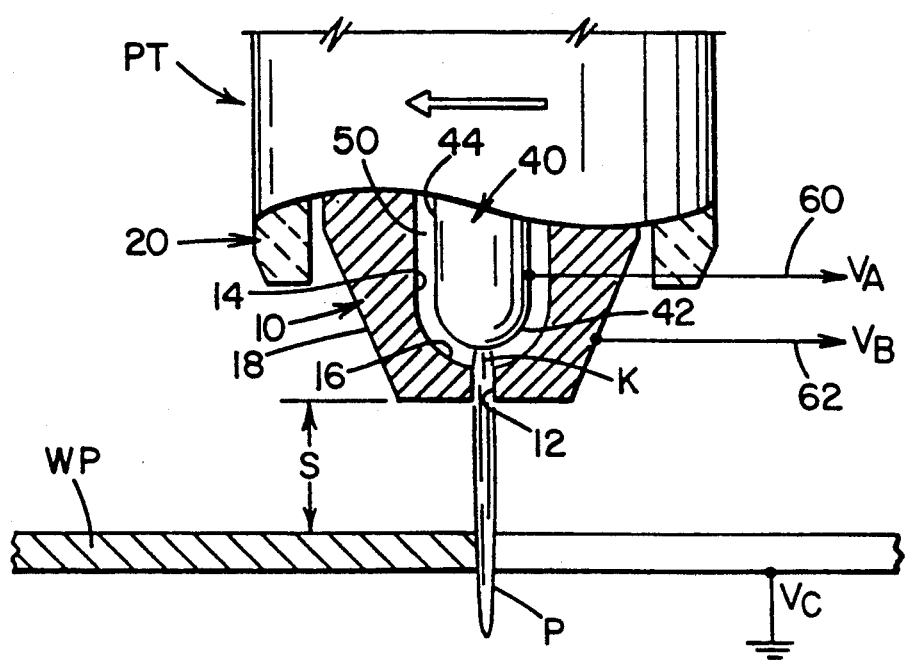
FIG. 3A is a partial schematic view showing the plasma arc torch operating properly in a high current mode.
Figure 3B:
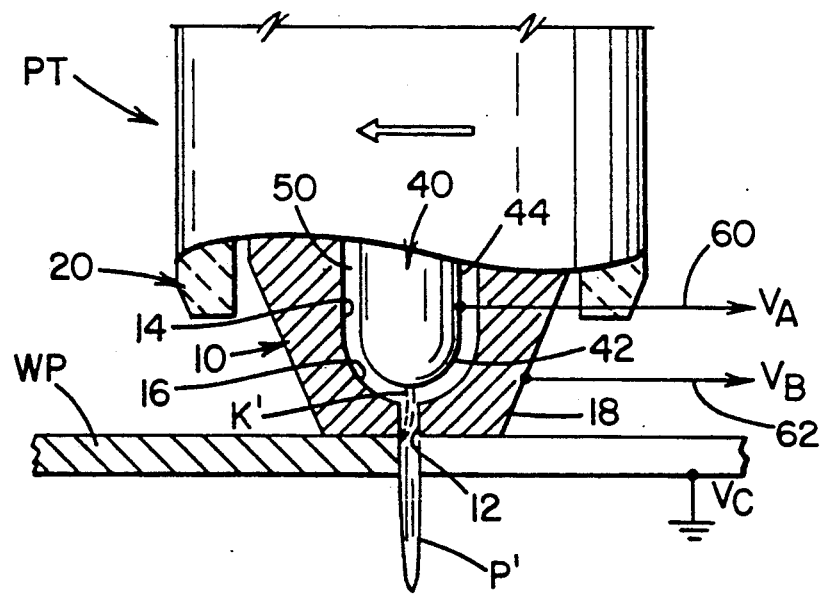
FIG. 3B is a partial schematic view showing a torch operating in a manner to rapidly destroy the nozzle with the torch in the high current mode.
Figure 3C:
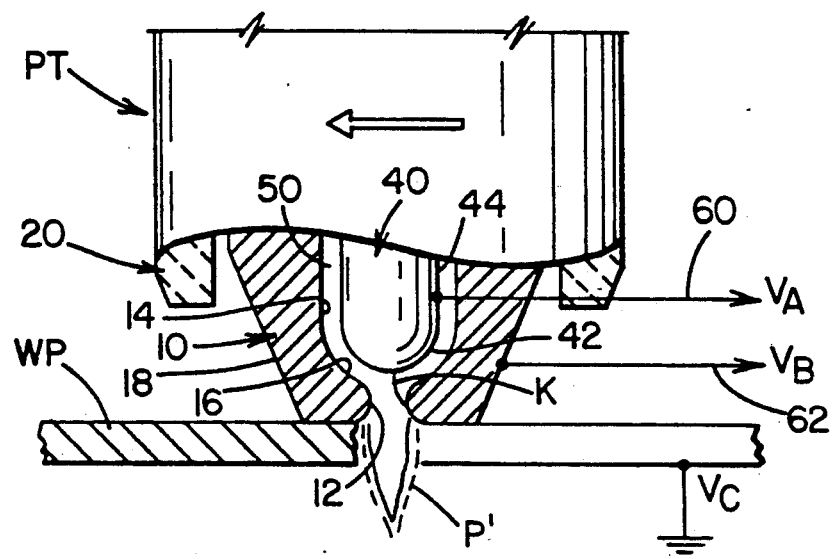
FIG. 3C is a view similar to FIG. 3B showing the results of a relatively short time of operation as shown in FIG. 3B.

Deterioration of the nozzle is schematically illustrated in FIGS. 3A–3C wherein normal high current operation is shown in FIG. 3A. At the high current mode, plasma P is driven by a high current and arc K is maintained in the plasma column P. When the nozzle improperly contacts the workpiece, as shown in FIG. 3B, arc K is transferred into a somewhat non-descript arc K' which extends through outlet 12 to workpiece WP and tends to attach to the nozzle. This arc action produces a modified, dispersed plasma P' having an enlarged cross section and less energy per cross sectional area. This arc action reduces cutting efficiency and causes drastic and rapid erosion of the outlet 12 by enlarging the size of the outlet, as shown in FIG. 3C. Arc K' attaches to the nozzle and rapidly erodes portions if not all of the inner wall of outlet 12. This enlarges the outlet 12 to produce a large diameter plasma P' shown schematically in dotted lines. The optimum shape of plasma P is shown in solid lines. This shape results in cutting efficiency. Thus, the torch is rapidly rendered ineffective when contact is made between the nozzle and the workpiece as the torch PT is cutting in the high current mode of operation.

To prevent the deterioration of the nozzle as described in FIGS. 2A-2D and FIGS. 3A-3C, the present invention provides a circuit for protecting the nozzle. The inventive protective circuit includes means for sensing the voltage of the nozzle, means for comparing the nozzle voltage with a reference voltage and means for limiting the arc current to the torch, i.e. holding the current to a low level and/or setting a low level maximum obtainable current, when the nozzle voltage is within a selected range of the reference voltage. In accordance with another aspect of the invention, the high current mode is allowed to continue when the operator raises the torch to remove the detected contact. In the preferred embodiment, the reference voltage is voltage $V_C$ which voltage is the grounded workpiece voltage. The selected range or voltage amount is less than 5.0 volts. Thus, when the nozzle contacts the workpiece the voltage between these two metal components generally equalizes so that the nozzle voltage is at the reference voltage. This condition is sensed and the arc current is shifted at power supply PS to the low current level, which in practice is 40 amperes. The low level or low current mode of operation may be at any desired low, non destructive operating current, such as a low current in the range of 35-50 amperes. The particular value of the low current level of torch PT is not a broad aspect of the present invention.

The protective circuit, as defined above, is used in a system and method for protecting torch PT by detecting the voltage of the nozzle and, upon such detection, shifting power supply PS to a lower mode of current operation. Workpiece contact is also a sensed condition when the nozzle contacts any grounded metal. In accordance with the invention, whenever contact is detected, torch PT shifts to a low current mode of operation. When the contact is broken, normally by the operator, the torch shifts back into its normal current set point, which current may be substantially above the minimum current level of the low current operating mode. When the operating current level is noticeably decreased, the operator is alerted to a surface contact. The torch is merely lifted from the workpiece and the cutting operation is continued without any hesitation for restarting. This is a substantial advance in the art of plasma arc cutting.

Figure 4:
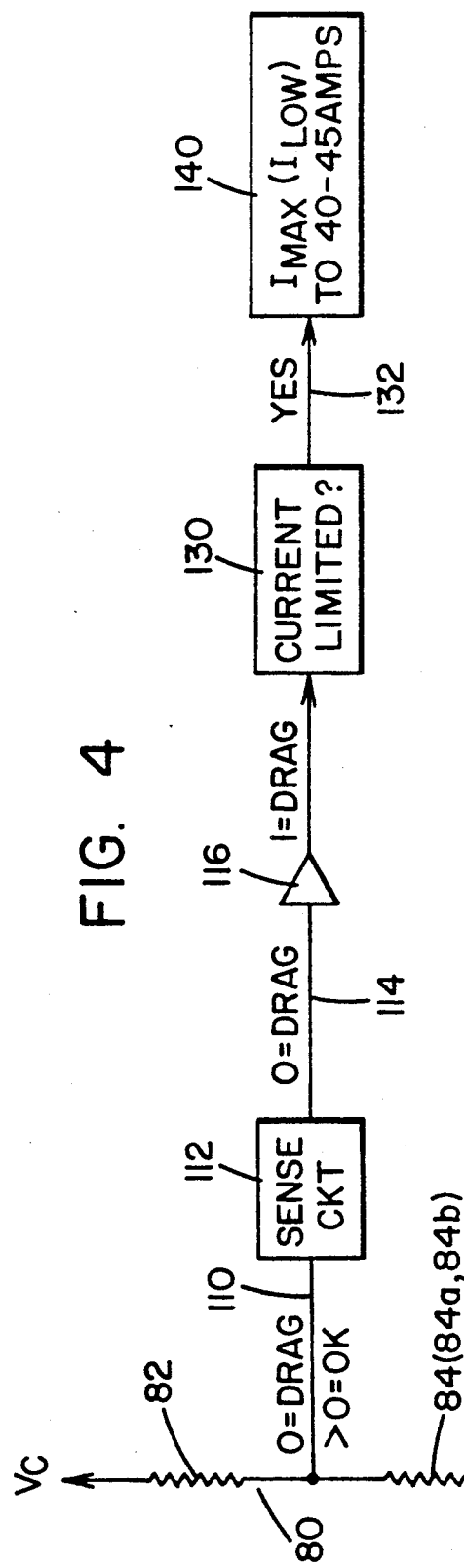
FIG. 4 is a schematic wiring and block diagram showing the preferred embodiment of the present invention.
Figure 5:
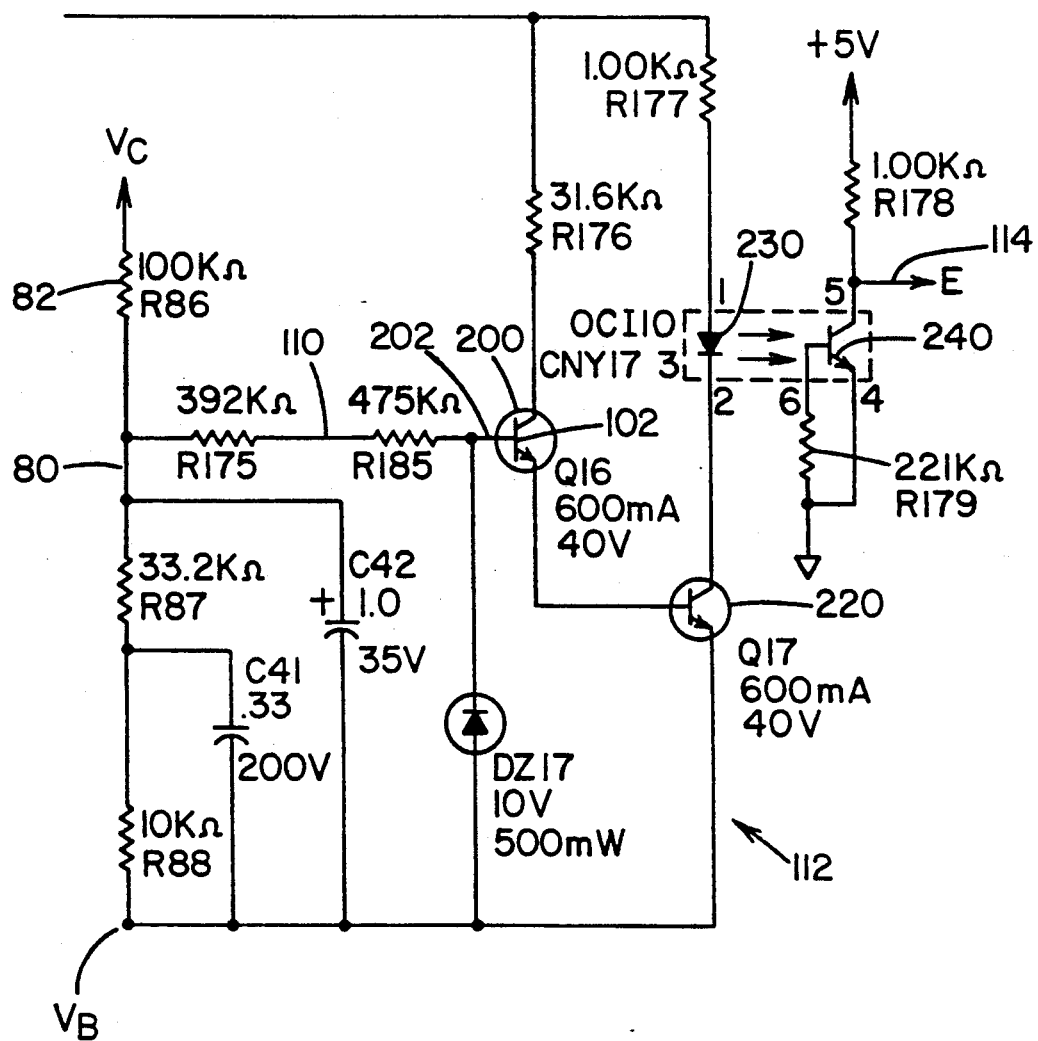

A variety of arrangements could be used for detecting nozzle contact and then shifting the power supply to provide a low current mode until the nozzle contact is broken. One of the arrangements for accomplishing this inventive concept is illustrated in FIGS. 1, 4 and 5 wherein resistor or resistor network 80 is a voltage divider with resistor sections 82, 84. A "CONTACT" sensing line 110 is connected to read the voltage between the resistor sections. The voltage on sensing line 110 is shifted toward voltage $V_C$ when nozzle 10 contacts workpiece WP. Grounding of line 62 places a logic 0 on line 110. This voltage actuates a drag or contact sensing circuit 112. A logic 0 from circuit 112 appears in output 114 and is communicated with microprocessor of power supply PS where the logic can be inverted, as indicated schematically by inverter 116 in FIG. 4. The "CONTACT" signal is interrogated by a contact identifying subroutine schematically illustrated as "Current Limit" block 130. If nozzle contact is identified by subroutine 130, a signal indicated as line 132 is outputted from the microprocessor to a phased back control 140 of the input rectifier of power supply PS. Phase back control 140 can set the output of the power supply to a low current level, i.e. 40 amperes, or it can set a maximum current level at the 40 amperes. In this latter arrangement, a low current set point below 40 amperes will not be affected by a CONTACT signal. Thus, an appropriate contact indication in line 132 shifts the maximum current to low current level, which in practice is 40-45 amperes. Thus, when contact is made by the nozzle to the workpiece the maximum current available between the electrode and the nozzle is 40-45 amperes. When there is no nozzle contact identified by subroutine 130, current 140 is released and the power supply operates in accordance with the set point current level adjusted by set point device 70. If this set point current is greater than the controlled low current of phase back control 140, then the power supply shifts between the low current mode of 40-45 amperes and the higher current mode manually selected at set point device 70. If the current level of torch PT is equal to or below the low current value of the phase back device 140, then nozzle contact has no effect on the operation of power supply PS and the cutting operation continues in normal fashion even if the nozzle is in contact with the workpiece, as shown in FIG. 2A.

Figure 4A:
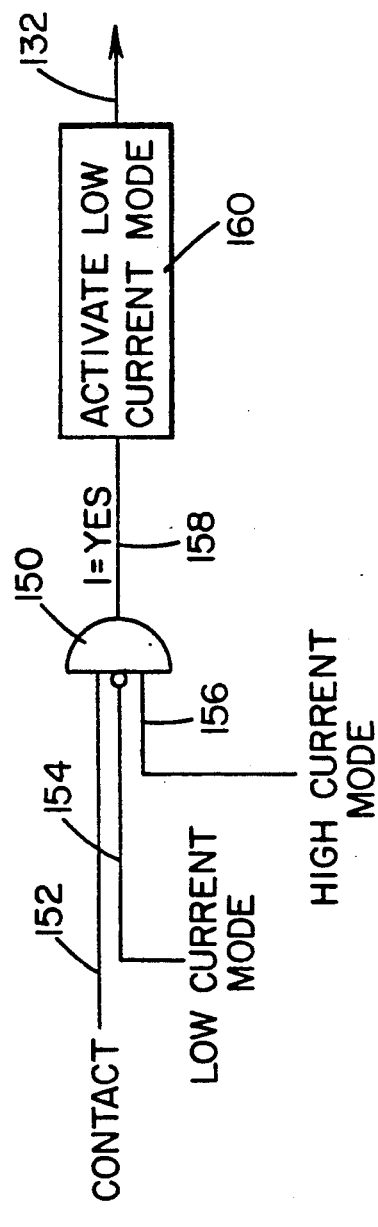
FIG. 4A is a schematic logic diagram to illustrate the continuous monitoring concept of the present invention; and, FIG. 5 is a wiring diagram of the detection circuit used in practice.

Referring now to FIG. 4A, this is merely an illustrative explanation of operating characteristics of a plasma cutting system using the invention. AND gate 150 is shown as having inputs 152, 154 and 156 with an output 158. Nozzle contact places a yes or logic 1 condition on line 152. A lack of a low current mode makes input line 154 a logic 1. The existence of a high current mode applies a logic 1 to input 156. Thus, if there is contact during a high current mode of operation, output 158 is energized. This shifts or actuates low current mode circuit 160 to give a logic 1 in line 132. If the nozzle contact appears during a low current mode of operation then a logic 0 appears on input 154 of gate 150. This produces a logic 0 in line 158 and deactivates circuit or subroutine 160 to provide no output signal in line 132. This operation of the invention represents a slightly modified concept of the invention than the concept previously described. In the previous architecture shown in FIG. 4, a maximum low current is set whenever there is contact or an actual low current is set for the power supply. When there is no contact, the maximum current or low current is released and set point device 70 controls the operation of power supply PS. A slight modification of the system in FIG. 4 is shown in FIG. 4A, where there is no signal in line 132 if the nozzle contacts the workpiece when the torch is already in the low current mode of operation. Whenever there is nozzle contact with the torch in the high current mode, there is a signal in line 132. This slight modification allows the power supply to shift back and forth in the same manner as the preferred embodiment illustrated in FIG. 4. FIG. 4A is merely a schematic logic diagram to show another logic arrangement that could be used for practicing the present invention. The invention is detecting the touching of the nozzle to a grounded metal such as the workpiece and, then, limiting the arc current to a low level while contact exists during the cutting operation. This novel arrangement does not turn off the torch, or disrupt the cutting operation. The operator upon noticing a shift to a low current merely lifts the torch and continues cutting.

FIG. 5 reveals the detail circuit 112 for sensing contact of the nozzle and workpiece. In this practical implementation of a contact detecting circuit 112, cascaded transistors 200, 222 are conductive when line 110 is grounded to give a contact signal. Base 202 of transistor 200 is then grounded to actuate circuit 112. Transistor 220 is conductive and LED 230 is activated. Optical coupled output 240 is then energized to produce a drag or contact signal in line 114 as schematically illustrated in FIG. 4. In this manner, a signal appears in line 114 when the voltage $V_B$ is within 5.0 volts of voltage $V_C$ or ground potential.

At low currents, the arc can attach to the nozzle or pass through the outlet without rapid damage to the nozzle. When the current is high the nozzle must remain spaced from the workpiece so the arc will pass directly through the outlet to the workpiece. When the nozzle contacts the workpiece, this high current operation will damage the nozzle by attaching to the nozzle while forming the low resistance or impedance path for the arc.

Having thus defined the invention, the following is claimed:

1. A system for protecting the nozzle of a plasma torch comprising a nozzle with a plasma outlet opening and an internal electrode chamber and an elongated electrode in said chamber and spaced from said nozzle a distance defining an annular gas passage means for allowing flow of a gas through said passage means and through said outlet for impingement against a workpiece below said outlet as an electrical power supply maintains an arc current to said electrode for sustaining said plasma from said nozzle to said workpiece, said system comprising: current control means for selectively shifting said power supply between a first high arc current mode and a second low arc current mode greater than zero, means for detecting contact of said nozzle with said workpiece and means responsive to said detection for holding said current control means in said second mode as long as said contact is detected.

2. A system as defined in claim 1 wherein said second mode is effected by means for limiting said arc current to a given value.

3. A system as defined in claim 2 wherein said given value is in the range of 30–50 amperes.

4. A system as defined in claim 3 wherein said first mode is effected by means for maintaining said arc current above a selected value.

5. A system as defined in claim 4 wherein said selected value is in the range of about 75–100 amperes.

6. A system as defined in claim 1 wherein said first mode is effected means for maintaining said arc current above a selected value.

7. A system as defined in claim 6 wherein said selected value if in the range of about 75–100 amperes.

8. A system as defined in claim 7 wherein said detecting means includes voltage means for sensing the absence of a significant voltage differential between said workpiece and said nozzle and means for creating an output signal when there is substantially no voltage differential between said nozzle and said workpiece.

9. A system as defined in claim 8 wherein said voltage means is a voltage divider between said workpiece and said nozzle.

10. A system as defined in claim 6 wherein said detecting means includes voltage means for sensing the absence of a significant voltage differential between said workpiece and said nozzle and means for creating an output signal when there is substantially no voltage differential between said nozzle and said workpiece.

11. A system as defined in claim 10 wherein said voltage means is a voltage divider between said workpiece and said nozzle.

12. A system as defined in claim 3 wherein said detecting means includes voltage means for sensing the absence of a significant voltage differential between said workpiece and said nozzle and means for creating an output signal when there is substantially no voltage differential between said nozzle and said workpiece.

13. A system as defined in claim 12 wherein said voltage means is a voltage divider between said workpiece and said nozzle.

14. A system as defined in claim 1 wherein said detecting means includes voltage means for sensing the absence of a significant voltage differential between said workpiece and said nozzle and means for creating an output signal when there is substantially no voltage differential between said nozzle and said workpiece.

15. A system as defined in claim 14 wherein said voltage means is a voltage divider between said workpiece and said nozzle.

16. A method of protecting the nozzle of a plasma torch of the type comprising a nozzle with a plasma outlet opening and an internal electrode chamber and an elongated electrode in said chamber and spaced from said nozzle a distance defining an annular gas passage means for allowing flow of a gas through said passage means and through aid outlet for imingement against a workpiece below said outlet as an electrical power supply maintains an arc current to said electrode for sustaining said plasma from said nozzle to said workpiece and current control means for selectively shifting said power supply between a first high arc current mode and a second low arc current mode greater than zero, said method comprising the steps of:
    (a) detecting contact of said nozzle with said workpiece; and,
    (b) maintaining said current control means in said second mode in response to said contact detection as long as said contact is being detected.

17. A method as defined in claim 16 wherein said maintaining step includes the step of limiting said arc current to a given value.

18. A method as defined in claim 17 wherein said given value is in the range of 35–50 amperes.

19. A method as defined in claim 16 wherein said detecting step includes the steps of:
    (c) sensing the absence of a voltage differential between said workpiece and said nozzle; and,
    (d) creating a contact indicating signal when there is substantially no voltage differential between said nozzle and said workpiece.

20. A method as defined in claim 19 including the additional steps of determining if said current control means is in said first mode and, if said current control is in said first mode upon creation of said contact indicating signal, shifting said current control means into said second mode.

21. A method as defined in claim 20 wherein said first mode is a current in the range of about 75-100 amperes.

22. A method as defined in claim 21 wherein said second mode is a current in the range of 35-50 amperes.

23. A method as defined in claim 19 wherein said second mode is a current in the range of 35-50 amperes.

24. A method as defined in claim 16 wherein

25. A method as defined in claim 24 wherein said second mode is a current in the range of 35-50 amperes.

26. A method as defined in claim 16 wherein said second mode is a current in the range of 35-50 amperes.

27. A method for protecting the nozzle of a plasma torch of the type comprising a nozzle with a plasma outlet opening and an internal electrode chamber and an elongated electrode in said chamber and spaced from said nozzle a distance defining an annular gas passage means for allowing flow of a gas through said passage means and through said outlet for impingement against a workpiece below said outlet and said nozzle as an electrical power supply maintains an arc current to said electrode for sustaining said plasma from said nozzle to said workpiece and current control means for selectively shifting said power supply between a first high arc current mode and a second low arc current mode greater than zero, said method comprising the steps of:
(a) sensing the voltage of said nozzle;
(b) comparing said nozzle voltage with a reference voltage; and,
(c) causing said torch to be operated in said second mode when said sensed nozzle voltage is within a selected range of said reference voltage.

28. A method as defined in claim 27 wherein said range is less than 5.0 volts.

29. A method as defined in claim 27 wherein said reference voltage is the voltage voltage of said workpiece.

30. A method as defined in claim 27 wherein said second mode limits arc current to a value in the range of 35-50 amperes.

31. A circuit for protecting the nozzle of a plasma arc torch as it operated at a high current level, said circuit comprising means for sensing the voltage at said nozzle, means for comparing said nozzle voltage with a reference voltage and means for limiting the arc current to said torch to a current value greater than zero when said nozzle voltage is within a selected range of said reference voltage.

32. A protection circuit as defined in claim 31 wherein said range is less than 5.0 volts.

33. A protection circuit as defined in claim 32 wherein said reference voltage is the voltage of said workpiece.

34. A protection circuit as defined in claim 33 wherein said means for limiting arc current includes means for holding said arc current at a value in the range of 35-50 amperes.

35. A protection circuit as defined in claim 31 wherein said reference voltage is the voltage of said workpiece.

36. A protection circuit as defined in claim 35 wherein said means for limiting arc current includes means for holding said arc current at a value in the range of 35-50 amperes.

37. A protection circuit as defined in claim 31 wherein said means for limiting arc current includes means for holding said arc current in the range of 35-50 amperes.

* * * * *